Figure 1:
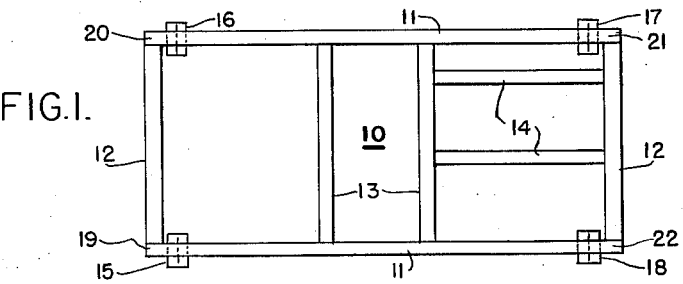

March 27, 1962 — J. W. McNULTY — 3,026,607
METHOD OF LEVELING A MACHINE MOUNTED ON A BEDPLATE
Filed Sept. 10, 1958

INVENTOR
JOHN W. McNULTY
BY Frank Critires Jr.

United States Patent Office 3,026,607
Patented Mar. 27, 1962

3,026,607
METHOD OF LEVELING A MACHINE
MOUNTED ON A BEDPLATE
John W. McNulty, Ridley Park, Pa., assignor to Westinghouse Electric Corporation, East Pittsburgh, Pa., a corporation of Pennsylvania
Filed Sept. 10, 1958, Ser. No. 760,253
5 Claims. (Cl. 29—407)

This invention relates to a method of leveling a support structure for a machine, more particularly to a method for duplicating the initial leveling of a bedplate having a machine mounted thereon, and has for an object to provide a simplified, yet accurate, method of the above type.

Rotating machines or mechanisms are often mounted on unitary support structure or bedplates during fabrication and subsequently are shipped to their ultimate destination as a unit or set, thereby facilitating final installation in the field, improving the reliability of the unit and minimizing the possibility of incorrect or poor installation. However, in spite of the extreme care taken by the manufacturer during initial leveling of the bedplate and machine, if such leveling is not carefully duplicated at final installation, the bedplate may be warped or deflected, thereby unduly stressing the machine and causing misalignment of rotating shafts and bearings with consequent failure of the machine to operate, and excessive vibration and/or wear leading to ultimate failure.

One notable example of such a unit is a turbine-generator set, wherein a fabricated bedplate is supported at four or more points and is employed to support a steam turbine and an electric generator drivenly connected to the turbine. Since alignment of the driving and driven members is critical for proper performance, it is essential that the initial leveling of the bedplate, with the turbine and generator mounted thereon, be accurately duplicated at final installation to prevent stressing and misalignment of the driving and driven members as well as other movable components.

In accordance with the invention, the bedplate is first placed on at least four peripheraly spaced support members, the heights of which are selected so that the bedplate is supported in a substantially level position.

The machine, for example, a turbine, a generator, driving gearing and other components are then assembled on the bedplate to form a unit and then carefully adjusted and aligned.

The support member under the least loaded portion of the bedplate is then removed and the amount of downward deflection at the unsupported portion of the bedplate is recorded.

The remaining three support members are subsequently removed and the unit is moved to a new location, such as the customer's premises, for final installation on his site.

To reestablish or duplicate the initial leveling of the unit, the unit is placed on permanent support members located in the same positions as the three support members which were the last to be removed during initial leveling.

The vertical height of the space under the unsupported portion of the bedplate is then measured, and this measurement is added to the initially recorded deflection value to attain the exact height of the required fourth support.

The fourth support is then placed under the unsupported portion of the bedplate, thereby restoring the bedplate to its initial leveling attained in fabrication, whereupon the unit may be permanently bolted or otherwise anchored, if desired.

Figure 3:
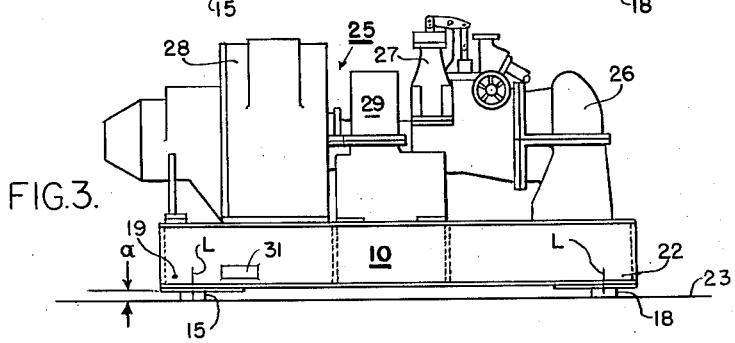
Figure 4:
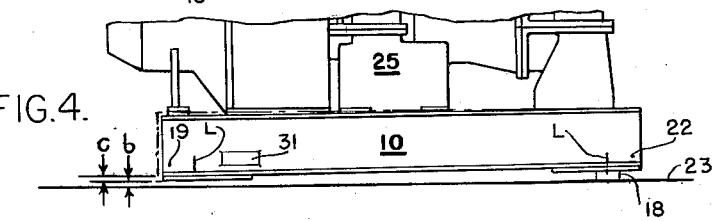
Figure 5:
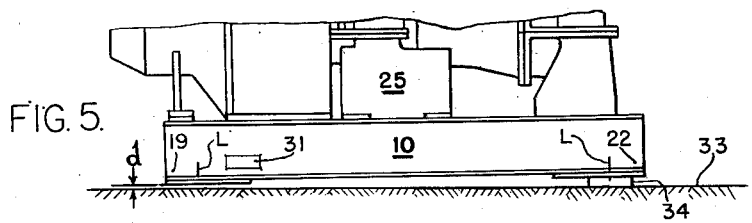
Figure 6:
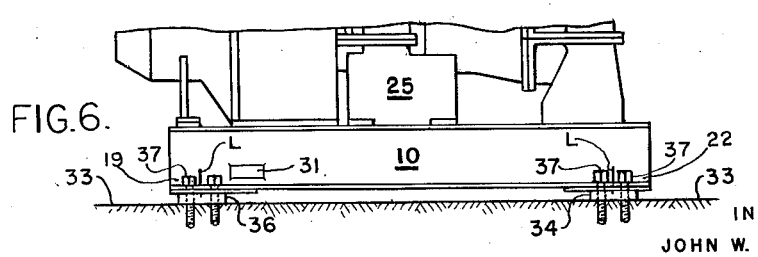

The foregoing and other objects are effected by the invention as will be apparent from the following description and claims taken in connection with the accompanying drawing, forming a part of this application, in which:

FIGS. 1 to 4, inclusive, are somewhat schematic views illustrating the initial leveling method during fabrication of a turbine-generator set in accordance with the invention; and FIGS. 5 and 6 are schematic views illustrating the method by which the initial leveling is duplicated at final installation.

Figure 2:
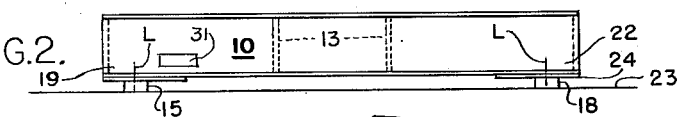

Referring to the drawing in detail, in FIGS. 1 and 2 there is shown a rectangular bedplate 10 in plan and elevation, respectively. The bedplate 10 may be of any suitable type. However, as illustrated, it is of the fabricated type employing a pair of channel-shaped side rails 11 and end rails 12 joined, as by welding, at their meeting surfaces and forming the periphery of the bedplate. An additional pair of internal transverse rails 13 and internal longitudinal rails 14 may further be welded to the side rails and end rails, as shown, to lend additional strength to the bedplate, as well known in the art.

The thus formed bedplate 10 is initially placed on four peripherally spaced support members 15, 16, 17 and 18 disposed below the corner portions 19, 20, 21 and 22, respectively, of the bedplate. The exact placement is not critical, but to permit duplication in the field, the placement of the support members may be indicated on the bedplate by vertical lines L shown in FIG. 2. The support members 15-18, inclusive, may be of any suitable height to support the bedplate in a horizontal or level plane and are themselves placed on a generally level, but not necessarily absolutely flat, support surface 23. Accordingly, to properly support the bedplate in a truly level position without rocking, the heights of the support members may not be identical and are adjusted as required. Also, to avoid interference with the support surface, a flat plate or pad 24 may be welded to the bottom surface of each of the corner portions 19-22, inclusive.

After the bedplate 10 is leveled as described above, a machine 25 is mounted thereon, as shown in FIG. 3, to form a unit or set. The machine 25, for example, may include a steam turbine 26 having control mechanism 27 mounted thereon, an electric generator 28 adapted to be driven by the turbine 26, and speed reduction gearing structure 29 for drivingly connecting the turbine to the generator. During the mounting of the above machine elements, great care is taken to properly align the elements in a manner to avoid binding of the elements and attendant friction and stresses, thereby to insure satisfactory operation of the unit after final installation in the field.

The machine 25 is then secured to the bedplate 10 by suitable bolts (not shown) and the height $a$ of one of the support members, for example, support member 15, is noted. Support member 15 is then removed from its bedplate supporting position, causing the thus unsupported corner portion 19 of the bedplate to deflect downwardly and assume a stable position in which the space therebelow assumes a height $b$, as indicated in FIG. 4. The deflection $c$, which is equal to $a-b$, is then noted and recorded in any suitable manner, for example, on a plate 31 provided on the bedplate in the proximity of the corner portion 19.

The turbine-generator set, including the machine 25 and the bedplate 10, is then removed from the remaining support members and transferred to its ultimate site for final installation.

As shown in FIG. 5, the turbine-generator set may be attached to a generally level erecting foundation 33, and the initial leveling attained by the manufacturer is duplicated as follows:

(1) Three support members 34 (only one shown) are placed on the foundation 33 and located beneath the lines L in a manner to support the corner portions 20, 21 and 22 of the bedplate.

(2) The remaining corner portion 19 is left unsupported temporarily and the height of the space $d$ therebelow noted.

(3) Since the deflection $c$ of the corner portion 19 is a constant, the height of space $d$ is added to the deflection value $c$ to determine the height of the support required to level the set.

(4) A permanent support member 36 having a height equal to the sum of $d$ and $c$ is then inserted under the corner portion 19, beneath the locating line L, thereby to lift the latter corner portion to its original position relative to the other corner portions. The set is then preferably bolted to the foundation 33 by a plurality of bolts 37.

It will now be seen that the invention provides a highly simple method of duplicating, with accuracy, at final installation, the initial leveling attained during fabrication of a bedplate supporting a machine.

Although the bedplate 10 has been illustrated as rectangular, the invention may be practiced with a bedplate of any polygonal or other shape.

In many instances, the bedplate may be unequally loaded by the machine mounted thereon. Accordingly, in such circumstances, the deflection is recorded at the least loaded corner portion.

While the invention has been shown in but one form, it will be obvious to those skilled in the art that it is not so limited, but is susceptible of various changes and modifications without departing from the spirit thereof.

I claim:

1. A method for duplicating at installation the initial leveling during fabrication of a bedplate supporting a machine, comprising the steps of: placing temporary support members under spaced peripheral portions of said bedplate to support said bedplate, mounting a machine on said bedplate, removing one of said support members, thereby effecting a downward deflection of the unsupported peripheral portion of said bedplate, measuring the degree of said deflection, relocating the machine and bedplate on permanent support structure supporting said bedplate at all of said peripheral portions except said unsupported peripheral portion, and providing a permanent support member for said unsupported peripheral portion, said last-mentioned support member having a height equal to the vertical height of the space below said unsupported peripheral portion plus the degree of said deflection.

2. A method for duplicating at installation the initial leveling during fabrication of a bedplate supporting a rotatable mechanism comprising the steps of: providing a bedplate having at least four corner portions, placing temporary support members under said corner portions to support said bedplate, fixedly mounting said mechanism on said bedplate, removing one of said support members, thereby effecting a downward deflection of the unsupported corner portion of said bedplate, measuring and recording the degree of said deflection, removing the bedplate and mechanism from the remaining support members, relocating the mechanism and bedplate on permanent support structure supporting said bedplate at all of said corner portions except said unsupported corner portion, providing a permanent support member for said unsupported corner portion, said last-mentioned support member having a height equal to the vertical height of the space below said unsupported corner portion plus the recorded degree of said deflection, and securing said bedplate to said permanent support structure and said permanent support member.

3. A method for duplicating at installation the initial leveling during fabrication of a unitary structure including a bedplate supporting a rotatable mechanism, comprising the steps of: providing a generally polygonal bedplate having a plurality of corner portions, placing temporary support members under said corner portions to support said bedplate, fixedly mounting said mechanism on said bedplate to form a unitary structure, said unitary structure imposing less load on one of said corner portions than the other corner portions, removing the support member under the least loaded corner portion, thereby effecting a downward deflection of the unsupported corner portion of said bedplate, measuring the degree of said deflection, removing the unitary structure from the remaining support members, relocating the unitary structure on permanent support structure supporting said bedplate at all of said corner portions except said unsupported corner portion, and providing a permanent support member for said unsupported corner portion, said last-mentioned support member having a height equal to the vertical height of the space below said unsupported corner portion plus said deflection and being effective to eliminate said deflection.

4. A method for insuring precise duplication in the field, of the original leveling attained in the manufacturing plant, of an article of manufacture comprising a bedplate and a machine supported thereby, comprising the steps performed at the manufacturing plant of: placing said bedplate on four peripherally spaced support members, mounting said machine on said bedplate to provide a unitary structure, removing one of said support members, thereby effecting a downward deflection of the unsupported portion of said bedplate, and measuring and recording the degree of said deflection for the purpose of facilitating precise duplication of said original leveling in the field.

5. A method for insuring precise duplication at installation, of the initial leveling attained in the manufacturing plant during fabrication, of an article of manufacture including a bedplate having a machine mounted thereon, comprising performing the steps at the manufacturing plant of: providing a generally polygonal bedplate having at least four corner portions, placing support members under each of said corner portions to support said bedplate, mounting said machine on said bedplate, removing one of said support members, thereby effecting a downward deflection of the unsupported corner portion of said bedplate, measuring and recording the degree of said deflection for the purpose of facilitating precise duplication at installation in the field of said original leveling, and removing the bedplate and machine as a unit from the remaining support members.

References Cited in the file of this patent

UNITED STATES PATENTS

| | | |
|---|---|---|
| 1,309,386 | Yeomans | July 8, 1919 |
| 1,884,689 | Hilpert | Oct. 25, 1932 |
| 2,457,468 | Hercik | Dec. 28, 1948 |
| 2,479,023 | Pyrebrune | Aug. 16, 1949 |
| 2,847,755 | Mummert | Aug. 19, 1958 |
| 2,854,742 | Guild | Oct. 7, 1958 |
| 2,885,773 | Molinaro | May 12, 1959 |